US007260776B2

(12) United States Patent
Moreau et al.

(10) Patent No.: US 7,260,776 B2
(45) Date of Patent: Aug. 21, 2007

(54) METHOD AND DEVICE FOR PROCESSING A COMPUTER DOCUMENT IN A COMPUTER SYSTEM

(75) Inventors: Jean-Jacques Moreau, Rennes (FR); Herve Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 10/179,177

(22) Filed: Jun. 26, 2002

(65) Prior Publication Data
US 2003/0069907 A1 Apr. 10, 2003

(30) Foreign Application Priority Data
Jun. 29, 2001 (FR) .................................. 01 08699

(51) Int. Cl.
G06F 15/00 (2006.01)
(52) U.S. Cl. ......................... 715/513; 715/513; 705/43
(58) Field of Classification Search ................ 715/513, 715/517, 700, 522; 707/104.1, 700
See application file for complete search history.

(56) References Cited

U.S. PATENT DOCUMENTS

| 6,763,499 | B1 * | 7/2004 | Friedman et al. ........... 715/513 |
| 2002/0049790 | A1 * | 4/2002 | Ricker et al. ............... 707/513 |
| 2002/0085020 | A1 * | 7/2002 | Carroll ....................... 345/700 |
| 2002/0143821 | A1 * | 10/2002 | Jakubowski ................ 707/522 |
| 2002/0147748 | A1 * | 10/2002 | Huang et al. ............... 707/517 |
| 2002/0169788 | A1 * | 11/2002 | Lee et al. ................. 707/104.1 |

FOREIGN PATENT DOCUMENTS

WO WO 00/68828 11/2002

OTHER PUBLICATIONS

U.S. Appl. No. 10/186,753, filed Jul. 2, 2002.
L. Bompani et al., "Software Engineering and the Internet: a roadmap", Proc. of the Conf. on the Future of Software Eng., 2000., pp. 305-315, XP002202432, Limerick, Ireland.
S.A. Battle, et al., "Flexible Information Presentation with XML", IEE Colloquim Multimedia Databases and MPEG-7, IEE, London GB, Jan. 29, 1999, pp. 13-1-13-6, XP002128574, London, England.

(Continued)

*Primary Examiner*—Heather R. Herndon
*Assistant Examiner*—Quoc A. Tran
(74) *Attorney, Agent, or Firm*—Fitzpatrick, Cella, Harper & Scinto

(57) ABSTRACT

A method for processing a portion of a computer document in a computer system, the content of the computer document being represented by a markup language, each tag of which having a name and a value, the computer document being associated with a second computer document, referred to as a "schema document", the content of which is represented in a schema type markup language, the schema document defining the structure of the portion under consideration of the computer document. This processing method comprises the steps of: selection (S13) of a tag, referred to as the "current tag", in the portion of the computer document; searching (S15-S21) in the schema document for at least one declarative tag of a function associated with the selected tag of the computer document; creation (S23, S25) of a list of functions applicable to the current tag of the computer document from at least one declarative tag of a function, found in the schema document.

14 Claims, 5 Drawing Sheets

OTHER PUBLICATIONS

P. McKee et al., "Behavioural Specification Using XML", Distributed Computing Systems, 1999. Proceedings, 7th IEEE Workshop on Future Trends of Cape Town, South Africa, Dec. 20, 1999, pp. 53-59, Los Alamitos, CA.

Tim Bray et al., Extensible Markup Language (XML) 1.0 (Second Edition), W3C Recommendation Oct. 6, 2000, W3 Consortium, pp. 1-57.

* cited by examiner

METHOD AND DEVICE FOR PROCESSING A COMPUTER DOCUMENT IN A COMPUTER SYSTEM

The present invention relates in general terms to the processing of computer documents in communication networks such as the Internet.

More particularly, the invention concerns a method for processing a portion of a computer document in a computer system. The content of the computer document is represented with a markup language, and is associated with a second computer document, referred to as a "schema document", the content of which is represented in a schema type markup language, this second document defining the structure of the portion under consideration of the computer document. The invention also concerns a computer system capable of implementing such a method.

The World Wide Web (Web or WWW) constitutes the favoured interface for accessing the majority of resources available on the Internet. The Web is a set of Internet protocols and software programs which present the information in a hypertext format. The hypertext concept is used for constructing computer documents which reference other documents by means of links, easily selectable by inexperienced users.

The HTML language (HyperText Markup Language) is a tag language designed for describing the way in which documents must be displayed by Web browsers. This language, on account of its simplicity and ease of use, was quickly adopted as a standard in the Internet world. However, it is impossible to extend this language beyond what it was designed for, that is to say, the presentation of documents. Authors of documents are not in fact permitted to create new tags for their specific requirements.

The XML language (eXtensible Markup Language) was created notably to overcome the weakness of the HTML language. The XML language is defined according to a standard of the international organization known by the name "W3 Consortium" (W3C).

XML is a structuring tag language: each tag corresponds to one element, which can be present one or more times in the document. A tag can contain text or other tags. Where it contains other tags, a tag is comparable to a node of a tree. Unlike HTML, the tag name is not subject to a standard; it is defined by the programmer. Furthermore, each opening tag must be accompanied by a closing tag, or be an empty tag. This constraint makes it possible to create documents having a hierarchical structure which can be represented in the form of a tree.

Through its hierarchical (tree) structure, the XML language allows structured data to be represented. Moreover, an XML document is perfectly readable by an "informed" human being. Finally, as XML documents are in text format, they can easily be exchanged via the Web using existing protocols such as HTTP (Hypertext Transfer Protocol).

However, in the XML language, the data are of predetermined types; in particular it is not possible for a programmer to define new types, in particular complex types, from the predetermined types. One of the consequences is that, in an XML document, functions applicable to an element or object represented in the document cannot be defined directly.

However, with notably the development of electronic business on the Internet, it is desirable for it to be possible at the same time to view a computer document whose content is represented in XML, and directly view or be informed of the functions which can be initiated on objects contained in the document.

One known solution for meeting this requirement is to provide, in the XML document, an electronic address indicating the location of the executable code of a function applicable to an object in the document. This solution has the drawback of requiring an additional operation of loading another document containing the executable code represented in another language in order to be able to execute a function. Moreover, in order to be able to execute the called function on a local computer, it is necessary to have on this computer specific software for interpreting or compiling the executable code of the function and thus being able to execute it.

In addition, a function is usable only in connection with a single object, without the possibility of being applied to another object with different function input parameters (arguments).

As a complement to the XML language, "schema" languages are found, thus designated because they make it possible to define an XML document class, the term "instance document" often being used to define a document which is valid with respect to a certain schema. Thus a DTD (Document Type Definition) is a schema language which makes it possible to specify which elements are capable of appearing in the instance documents, which elements can be contained in other documents, and in what order they must appear. Most often, a DTD is a file on its own, external to the XML document.

Recently, another schema language appeared: XML Schema, also defined by a W3C standard. XML Schema has the advantage compared with the DTD of using the XML syntax. In other words, a document expressed in XML Schema (referred to as an XML schema) is an XML document. Thus any XML schema whatsoever can be handled by any XML editor.

The XML Schema language has, among others, the advantage, compared with the XML language, of allowing the creation of complex types.

An object of the present invention is to use the possibilities of creating complex types offered by a schema language such as the XML Schema language, with the aim of defining, simply, executable functions on an object contained in an XML document, and associating these functions automatically with the XML document, when the latter is presented to a user for example via a computer screen, or when the document is processed directly by a computer application.

To that end, the present invention concerns, according to a first aspect, a method for processing a portion of a computer document in a computer system, the content of the computer document being represented with a markup language, each tag having a name and a value, said value possibly including other tags; the computer document being associated with a second computer document, referred to as a "schema document", the content of which is represented in a schema type markup language, the schema document defining the structure of the portion under consideration of the computer document.

In accordance with the invention, the processing method comprises the following steps:

selecting a tag, referred to as the "current tag", in the portion of the computer document;

searching in the schema document for at least one declarative tag of a function associated with the selected tag of the computer document;

creating a list of functions applicable to the current tag of the computer document from at least one declarative tag of a function, found in the schema document.

In a preferred embodiment, the computer document is an XML document, and the schema document is an XML schema. The invention thus makes it possible to automatically associate a list of functions with a selected tag of an XML document. This list is created automatically when the XML document is used, for example viewed by a human user by means of a computer screen.

According to a preferred embodiment, the content of the computer document is displayed on a display screen of the computer system, the current tag being selected by a user on the display screen by means of a control device, for example a pointing device. The method then has a step of displaying the list of functions applicable to the current tag of said computer document.

In this way, a user consulting an XML document can, for example, simply by clicking on a mouse pointing to a chosen tag of an XML document being viewed, be informed immediately of the executable functions which apply to this tag.

According to a preferred embodiment, the structure of each of the tags contained in the portion of the computer document is defined in the schema document by appropriate tags in which a particular field contains the name of the corresponding tag of the computer document. Thus, the step of identifying at least one declarative tag of a function associated with the current tag in the computer document is performed quickly by, firstly, searching in the schema document for a tag having the name of the current tag, and secondly, searching for function declarative tags, connected with the tag found previously.

According to one particular characteristic of the invention, the step of creating a list of functions applicable to the selected tag (the current tag) of the computer document, includes, for each function declarative tag found in the schema document, the following sub-steps:

reading at least one declarative tag of an argument of the function, said tag having a field defining the argument name, and a field defining the argument type;

determining the value of each argument by assigning, to said argument, the value of a tag of the computer document which is identified according to an identification mode coded in the declarative tag of the argument, in the schema document, or by assigning, to said argument, a value supplied by the user by means of a control device such as a computer keyboard.

Function calls can then be made easily and directly from a current tag of a computer document, since there is available a list of instantiated functions, that is to say those whose arguments have a specific value.

According to another preferred characteristic, the processing method according to the invention also has a step of executing at least one function from the displayed list, in response to a command generated by an action of the user on a control device such as a computer keyboard or a pointing device.

A user thus has available a means which is efficient and simple to use for initiating processing on a computer document (for example an XML document).

In one embodiment in which the computer system is connected to a communication network, for example the Internet, the function chosen by the user can be executed remotely on a second computer system connected to the first computer system via the network.

In practice, in the schema document, each declarative tag of a function also includes the electronic address of the executable code of the function, or directly includes the executable code of the function, the executable code possibly being in the form of source code, object code, or intermediate code between source code and object code.

Consequently, it is not necessary to install the code of the function on a client station connected to a communication network. Moreover, whatever the nature of the code of the function, source code or intermediate code between source code and compiled code, it is not necessary to pre-compile, in a server station, code of the function specific to each different operating system (OS) equipping the client stations on the network.

According to a variant embodiment or concurrently with the method as briefly described above, a method for processing a computer document according to the invention can also be defined by the following main steps:

selecting a tag, referred to as the "current tag", in said portion of the computer document;

searching in the schema document for a declarative tag of a predetermined function, associated with the selected tag of the computer document;

executing said predetermined function.

For example, the name of the function to be executed can be known to a computer application, which will automatically search for the function in the schema document, and then will automatically start the execution of the function, on the same computer system processing the computer document, or else remotely, on another computer system, through a communication network.

According to a second aspect, the invention concerns a computer system, connected or not to a communication network, characterised in that it has means adapted to implementing a method for processing a computer document, as briefly described above.

The present invention also concerns a computer program on an information medium. This computer program is remarkable in that it has program instructions adapted to implementing a method for processing a computer document as briefly described above, when this computer program is loaded and executed in a computer.

The invention also relates to an information medium containing such a computer program. Such an information medium can comprise a storage means, such as a ROM, for example a CD-ROM or a semiconductor ROM, or a magnetic recording means, for example a floppy disk or a hard disk. Moreover, the medium can be a transmissible medium such as an electrical or optical signal, which can be conveyed via an electrical or optical cable, or else by radio or by other means.

The advantages of this device, computer program, and of this information medium are identical to those of the method for processing a computer document in accordance with the invention, as briefly described above.

Other features and advantages of the invention will also emerge in the following description of a preferred embodiment of the present invention described with the help of the accompanying drawings in which.

Figure 1:
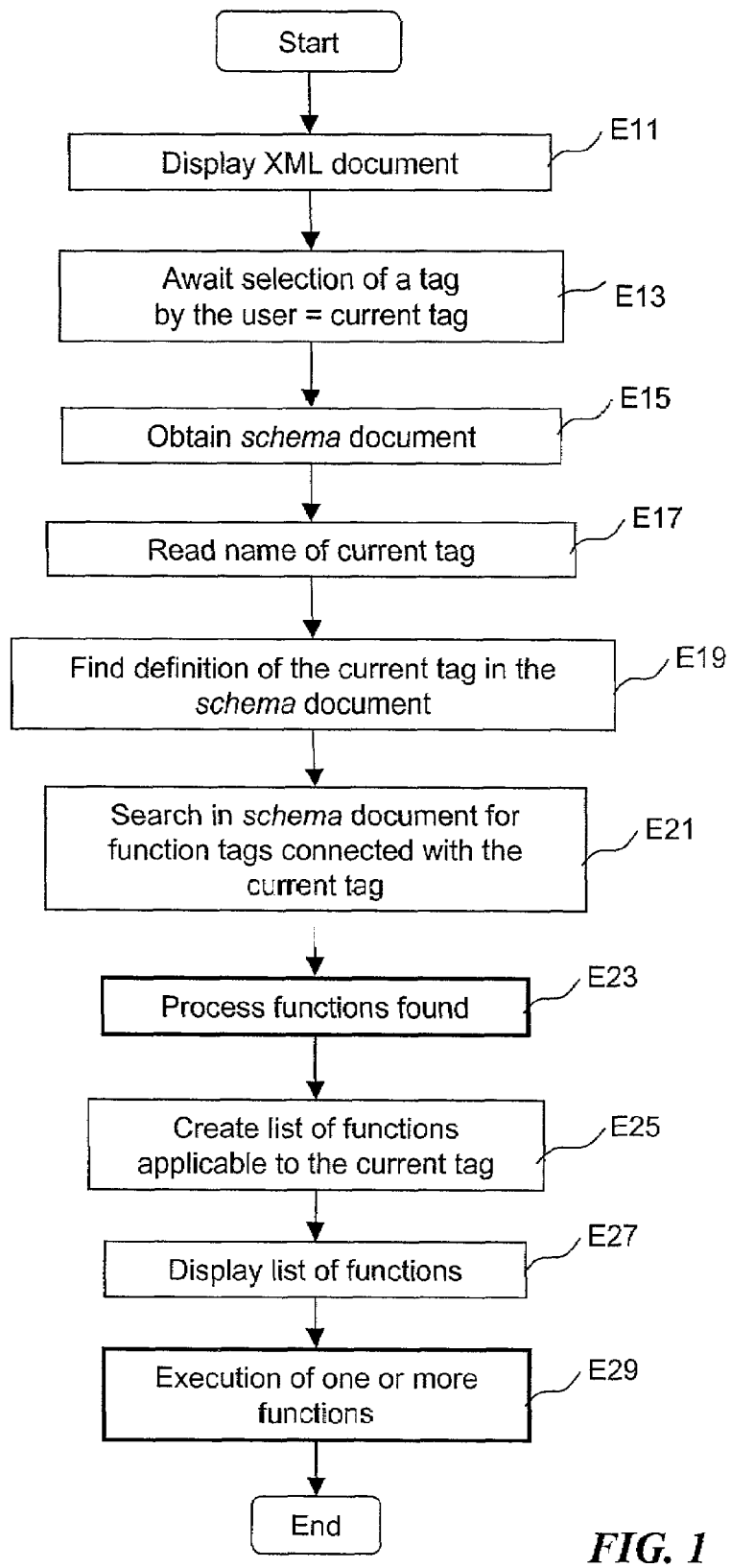
FIG. 1 is a flow diagram illustrating a method for processing a computer document according to the invention.
Figure 2:
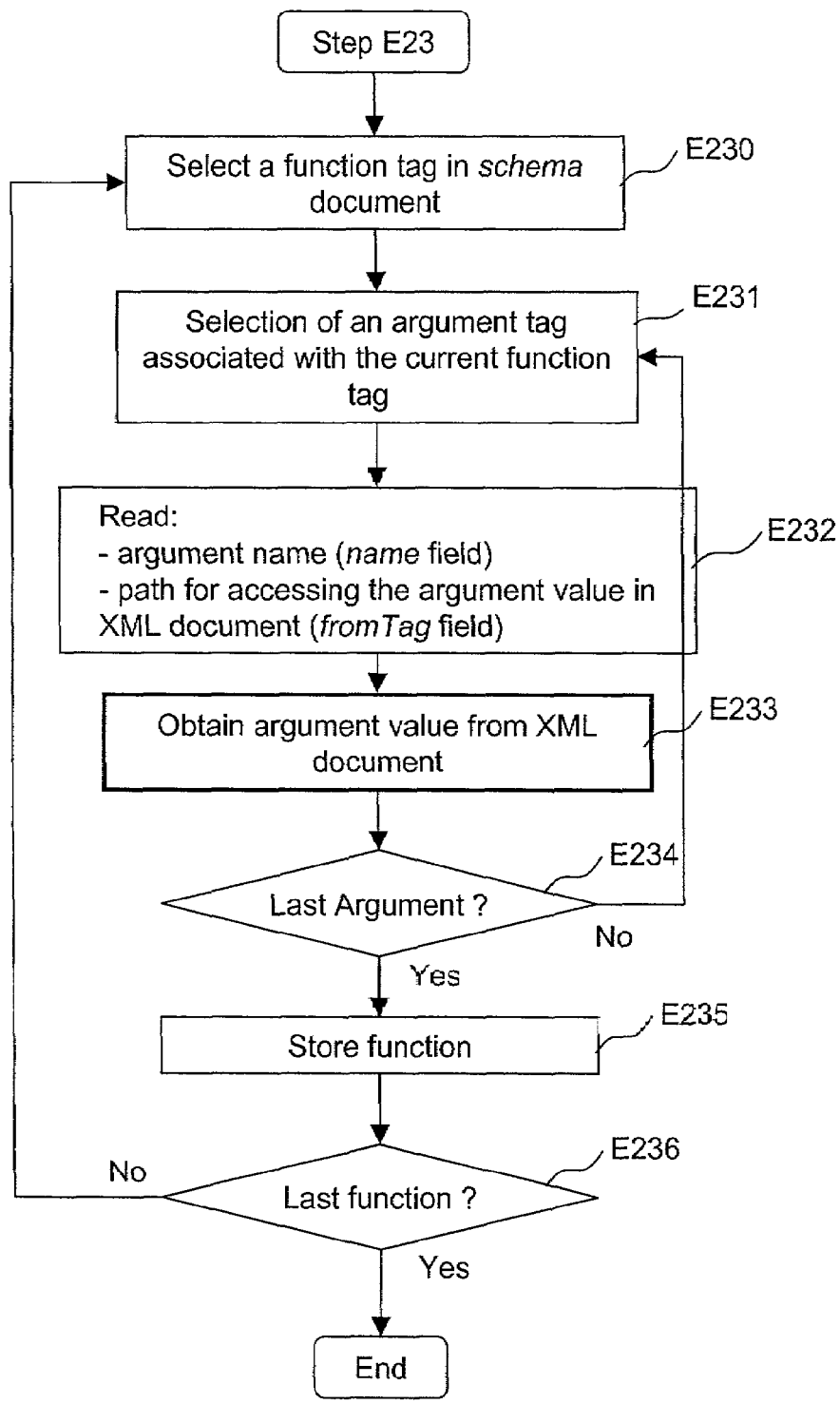
FIG. 2 is a flow diagram detailing the step (S23), depicted in FIG. 1, for processing functions associated with a tag contained in a computer document.
Figure 3A:
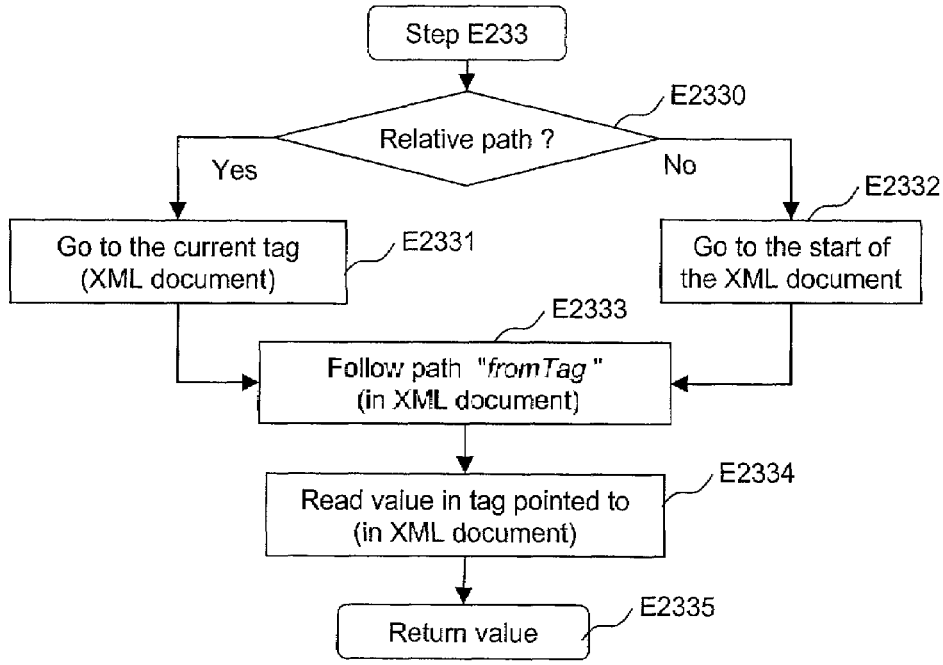
Figure 3B:
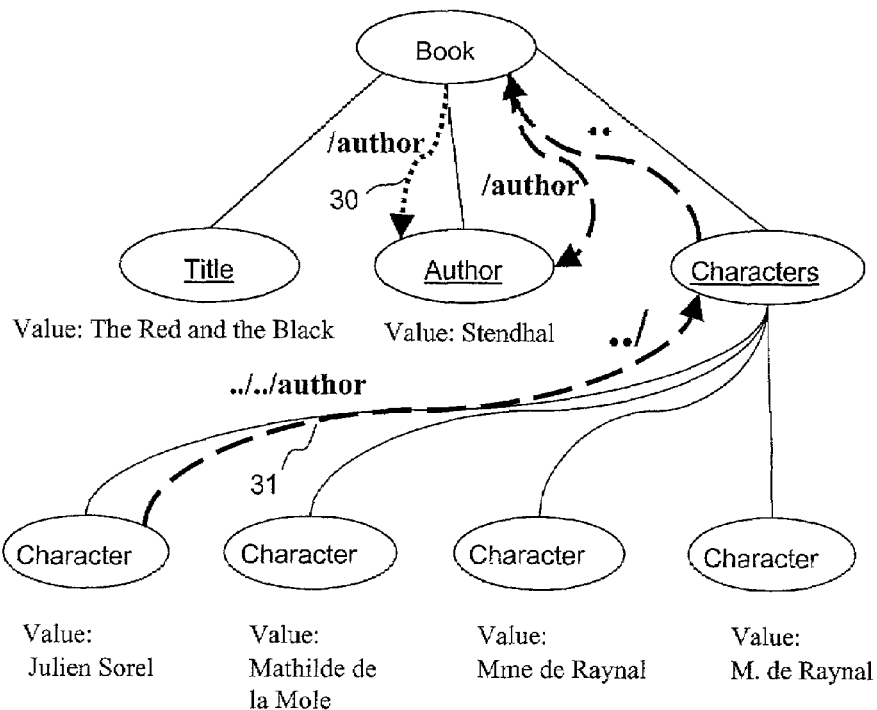
Figure 4:
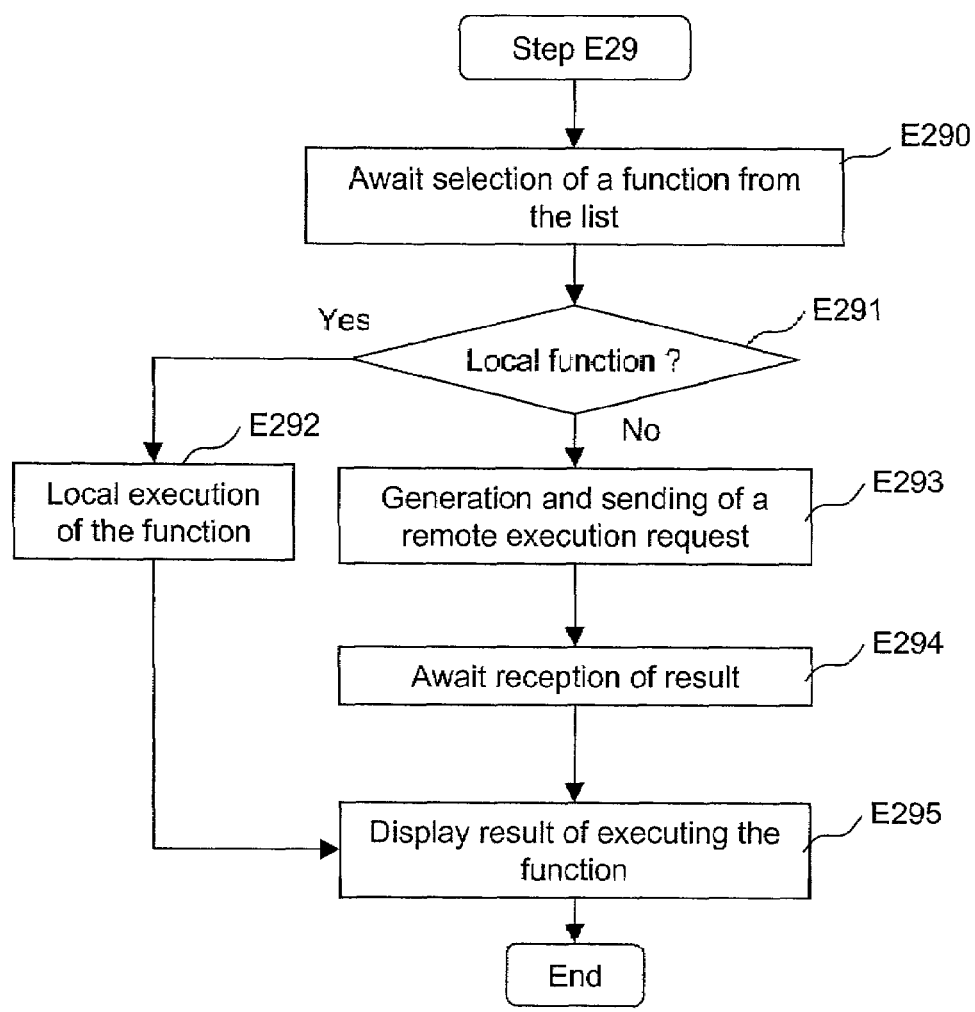
Figure 5:
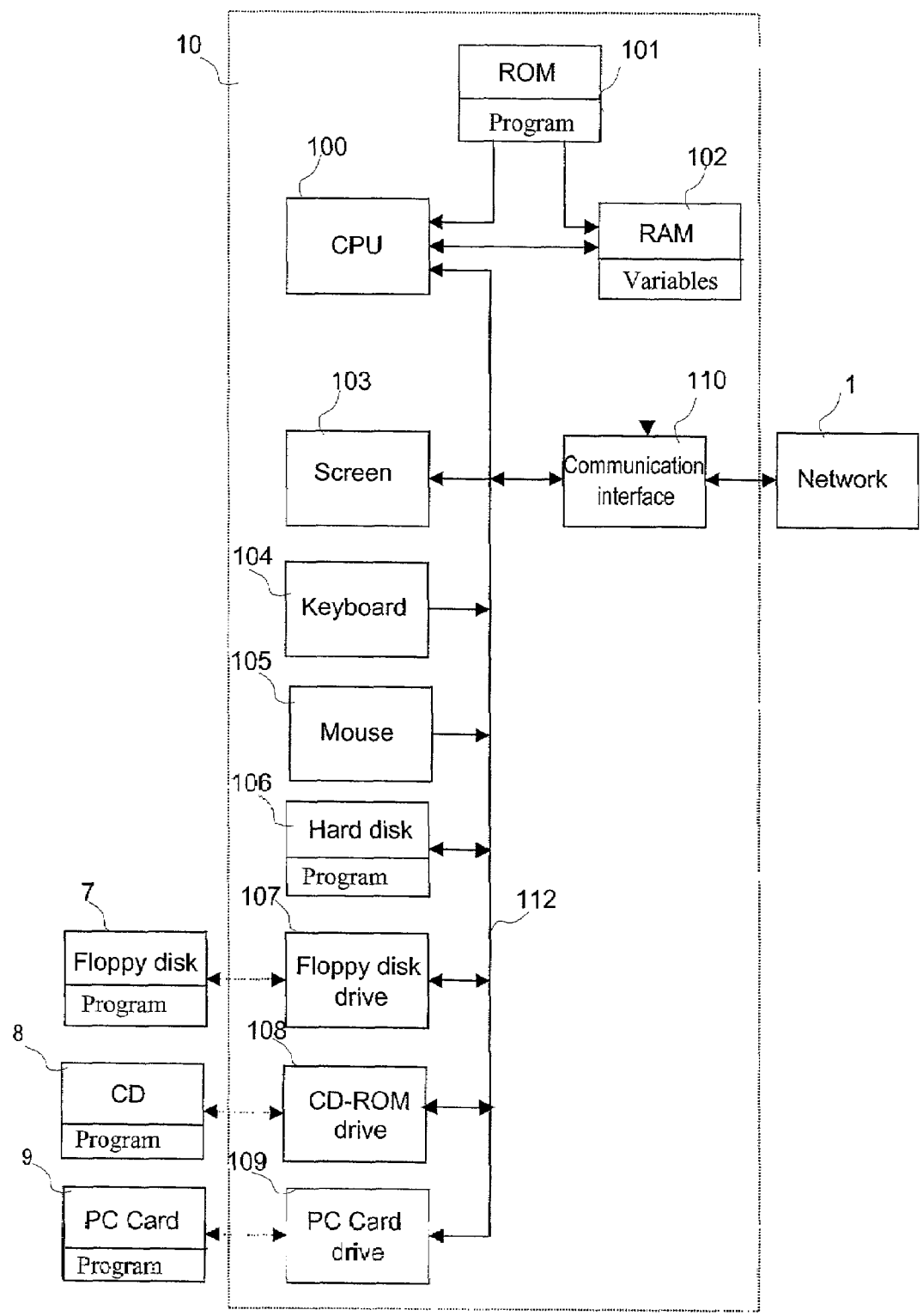

FIGS. 3a and 3b detail the step, depicted in FIG. 2 (S233), for obtaining the value of an argument;

FIG. 4 is a flow diagram detailing the step, depicted in FIG. 1 (S29), for executing functions associated with a tag contained in a computer document;

FIG. 5 depicts a computer system capable of implementing a method for processing a computer document according to the invention.

In the description which follows, a method for processing a computer document according to the invention will be described.

More precisely, it is a method for processing a portion of a computer document in a computer system. The content of the computer document is represented with a markup language in which each tag has a name and a value. The value of a tag can also contain other tags.

This computer document is associated with a second computer document, referred to as a "schema document", the content of which is represented in a schema type markup language (as described above). This schema document defines the structure of the portion to be processed of the computer document.

Within the context of the example implementation illustrated and described below, the computer document to be processed is a document whose content is represented in XML language, while the schema document is a document whose content is represented in XML Schema language.

There is given below an example portion of an XML document (book.xml) processed according to the invention in a computer system such as a microcomputer.

XML Computer Document:

```
<book>
    <title>The Red and the Black</title>
    <author>Stendhal</author>
    <characters>
        <character>Julien Sorel</character>
        <character>Mathilde de la Mole</character>
        <character>Mme de Reynal</character>
        <character>M. de Reynal</character>
        . . .
    </characters>
</book>
```

This XML document portion describes a main element, a book ("book" tag), having sub-tags (also referred to as "child tags"): "title", "author", "characters". The content of the "characters" tag consists of a number of sub-tags, each of which contains the name of a single character in the book.

This XML document can for example be obtained over the Internet by a user clicking with a mouse on a computer object published by a Web site.

In accordance with the state of the art at the date of filing of the present application, an XML schema, called "book.xsd", defining the structure of the preceding XML document (book.xml) is given below by way of example.

Schema Document "book.xsd" According to the State of the Art:

```
<xs:element name="book">
    <xs:complexType>
        <xs:sequence>
            <xs:element name="title" type="xs:string"/>
            <xs:element name="author" type="xs:string"/>
            <xs:element name="characters">
                <xs:complexType>
                    <xs:sequence maxOccurs="unbounded">
                        <xs:element name="character" type="xs:string"/>
                    </xs:sequence>
                </xs: complexType>
            </xs:element>
```

-continued

```
        </xs:sequence>
    </xs:complexType>
</xs:element>
```

As can be seen in the above schema document, the book element is defined as an element of complex type ("xs:complexType") comprising a number of sub-elements (that is to say sub-tags). These sub-elements are as follows:

"title" element of "string" type,

"author" element of "string" type,

"characters" element of complex type (complexType), having a sequence of sub-elements: "character" of "string" type, the maximum number thereof being "unbounded".

Thus, each tag of the XML Schema document (book.xsd), each identified by its name ("name" field), defines the structure of a corresponding tag, having the same name, in the XML document (book.xml).

As can be seen in the above schema document, there is no tag allowing the declaration of functions associated with elements of the XML document.

In accordance with the invention, a function declarative tag is declared in the XML schema document in the following manner:

<xs:function name="..." text="..."/> where:

"function" is the key word identifying a function declaration tag,

"name=" is a key word identifying a field whose value defines the function name, "text=" is a key word identifying an optional field whose value is text intended to be displayed for the user, when the function list is displayed.

Moreover, inside each of the function tags as defined above in the schema document, declarative tags of an argument are expressed in accordance with the invention in the following manner:

```
        <xs:argument name=" . . . " type=" . . . "/>
        . . .
        <xs:argument name=" . . . " type=" . . . "/>
``` where:

"argument" is the key word identifying an argument declaration tag,

"name=" is a key word identifying a field whose value defines the argument name, "type=" is a key word identifying a field whose value defines the argument type.

Given below is an example XML schema in accordance with the invention, this example stemming from the preceding XML schema "book.xsd", modified according to the invention:

Schema Document "book.xsd" Modified According to the Invention:

```
<xs:element name="book">
    <xs:complexType>
        <xs:function name="purchase" text="Purchase this book"
            href="http://oceania/web-obj/obj/purchase.exe"/>
            <xs:arguments>
                <xs:argument name="author" type="xs:string"/>
                <xs:argument name="title" type="xs:string"/>
            </xs:arguments>
        </xs:function>
        <xs:function name="orderTeaser" text="Download the 1st chapter"
            href="http://oceania/web-obj/obj/orderTeaser.exe"/>
            <xs:arguments>
                <xs:argument name="author" type="xs:string"/>
                <xs:argument name="title" type="xs:string"/>
            </xs:arguments>
        </xs:function>
        <xs:element name="title" type="xs:string"/>
        <xs:element name="author" type="xs:string"/>
        <xs:element name="characters">
            <xs:complexType>
                <xs:sequence minOccurs="0" maxOccurs="unbounded">
                    <xs:element name="character" type="xs:string"/>
                        <xs:complexType>
                            <xs:function name="viewPicture" text="View photograph"
                                href="http://oceania/web-obj/obj/viewPicture.exe"/>
                                <xs:arguments>
                                    <xs:argument
                                        name="author"
                                        fromTag="../../author"
                                        type="xs:string"/>
                                    <xs:argument
                                        name="title"
                                        fromTag="../../title"
                                        type="xs:string"/>
                                    <xs:argument
                                        name="character"
                                        fromTag="character"
                                        type="xs:string"/>
                                </xs:arguments>
                            </xs:function>
                            <xs:function name="playText" text="Hear text"
                                href="http://oceania/web-obj/obj/playText.exe"/>
                                <xs:arguments>
                                    <xs:argument
                                        name="author"
                                        fromTag="../../author"
                                        type="xs:string"/>
                                    <xs:argument
                                        name="title"
                                        fromTag="../../title"
                                        type="xs:string"/>
                                    <xs:argument
                                        name="character"
                                        fromTag="character"
                                        type="xs:string"/>
                                </xs:arguments>
                            </xs:function>
                        </xs:complexType>
                    </xs:element>
                </xs:sequence>
            </xs:complexType>
        </xs:element>
    </xs:complexType>
</xs:element>
```

As can be seen, the structure of each of the tags "<name>...</name>" (for example, "<title>...</title>") contained in the portion of the XML document under consideration, is defined in the schema document by appropriate tags:

<xs:element name="..." .../> or else

<xs:element name="..." ...>...</xs:element> in which the particular field, name="...", contains the name of the corresponding tag of the XML document.

In the example above, the additional elements in accordance with the invention are shown in bold. Thus the schema document "book.xsd" according to the invention has a number of functions declared connected with the tag named "book" (name="book"):

a function named "purchase", making it possible, when executed, to purchase the book;

a function named "orderTeaser" making it possible, when executed, to download the first chapter of the book.

These functions associated in the schema document with the tag named "book" (name="book") are thus directly associated with the tag "book" of the XML document (that is to say the tag "<book>...</book>").

It should be noted here that each of these function tags has an attribute text="...", making it possible to display on a computer screen for a human user the character string coded in this field (for example, "Purchase this book").

Similarly, associated in the schema document with the name tag "character", two functions are declared:

a function named "viewPicture" making it possible, when executed, to view a photograph of the selected character;

a function named "playText" making it possible, when executed, to hear a recording of the voice of a stage actor interpreting the selected character and reciting a piece of text.

As can be seen in the example XML Schema code above, each of the functions has arguments declared by tags: <xs:argument name="..." type="..."/>.

Thus the function "viewPicture" has three arguments:
"author" argument (name="author"),
"title" argument (name="title"),
"character" argument (name="character").

In this example, when a function has more than one argument, the tags declaring these arguments are "enclosed" by two argument list declaration tags: <xs:arguments>...</xs:arguments>.

In accordance with the invention, each declarative tag of a function, in the XML Schema document, also includes the electronic address of the executable code of the function.

In practice, this address is provided in a particular field corresponding to the attribute "href" (href="..."). Thus, the function "playText" has the attribute href="http://oceania/web-obj/obj/playText.exe" signifying that the executable code of the function "playText" is located on another computer system, the server "oceania", in the directory "web-obj/obj/" and, in this directory, in the file "playText.exe". Of course, in this example, the computer system under consideration is connected to an Internet type network, the electronic address of the function being an HTTP address. In this case, the function is then executable remotely over the network.

However, in a variant, the executable code of the function can be included directly in the schema document. Furthermore, this executable code can be in the form of source code, object code, or intermediate code between source code and object code.

As mentioned previously, each function declared in the XML Schema document has a declaration of one or more arguments defined by a tag of the type: <xs:argument name="..." type="..."/>.

As can be seen in the example schema document above, certain argument tags, for example those associated with the function "playText", have an additional attribute: fromTag="...".

In accordance with the invention, the value of this attribute ("..." field) represents a path in the XML document making it possible to find the tag whose value is to be assigned to the argument under consideration. This will be detailed later in the description, in connection with FIGS. 3*a* and 3*b*.

In connection with FIG. 1, there will now be described a method for processing a computer document according to the invention, this method using the new possibilities offered by the association, with a computer document (XML), of a schema document as described above.

As illustrated in FIG. 1, the processing method starts with a step S11 of displaying the XML document on a display screen associated with the computer system under consideration, for example a microcomputer. In a preferred implementation, the computer system is connected to the Internet, and the XML document is displayed by the use of a Web browser.

At the step S13 which follows, the selection of a tag by a user, for example by means of a control device, for example a pointing device such as a mouse, is awaited. The user can, for example, position the cursor directly on a tag of the XML document. The selected tag then becomes the "current tag" of the XML document.

In the embodiment chosen and depicted in FIG. 1, the selection of a tag of the XML document is performed by a user; however, in another embodiment, this selection may be performed automatically by a software application to which the name of the tag to be selected has previously been supplied as an input parameter.

Next, at the step S15, the schema document associated with the XML document is automatically loaded into the computer, the address of the schema document being mentioned in a prologue part of the XML document. This address can be local, or remote, that is to say pointing to another computer system accessible via the network.

When the schema document has been loaded, the name of the current tag (for example "book") is read (step S17). Next, the definition (that is to say the structure) of the current tag is searched for in the schema document (step S19). Implementation of the matching of a tag contained in the XML document and a tag of the schema document which defines it, is known per se to persons skilled in the art. Explained in a simplified manner, in order to perform this matching, the software can search in the schema document for the tag whose "name" attribute contains the same characters as the name of the current tag, in the XML document.

Thus, if the current tag is <character>Julien Sorel</character>, the tag <xs:element name="character" type="xs:string"/> is found in the schema document.

Next, at the step S21, a search is made in the schema document for the declarative tags of a function which are associated with the current tag (selected at the step S13) of the computer document.

In practice, the procedure is as follows: a search is made in the schema document for a tag having the name of the current tag, then a search is made for function declarative tags connected with the tag found which has the name of the current tag.

Thus, by way of example, if the current tag is <character>Julien Sorel</character>, the tag found in the schema document, at the step S19, is <xs:element name="character" type="xs:string"/>. The function declarative tags found at the step S21 are as follows:

<xs:function name="viewPicture" text="View photograph"
href="http://oceania/web-obj/obj/viewPicture.exe"/>
and
<xs:function name="playText" text="Hear text"
href="http://oceania/web-obj/obj/playText.exe"/>

At the following step, S23, the functions found are processed. More precisely, this is a question of giving values to the arguments defined for each of the functions. This step will be detailed below in connection with FIG. 2.

At the following step, S25, a list is created of the functions applicable to the current tag of the XML document, from the function declarative tags found and processed, respectively at the previous steps S21 and S23. This list is then stored temporarily, locally on the computer.

In the preferred embodiment depicted in FIG. 1, in which the content of the XML document is displayed on a screen of the computer system in order to be used by a user, the method for processing a computer document according to the invention has a step (S27) of displaying the list of functions applicable to the selected tag (the current tag) of the XML document.

Finally, at the step S29, at least one function in the displayed function list is executed, in response to a command generated by an action of the user on a control device such as a computer keyboard or a pointing device.

In practice, a new window is displayed on the screen showing the functions applicable to the selected tag of the XML document. For example, if the selected tag is <book> in the XML document given as an example, the text which follows will be displayed on the screen, indicating to the user the function directly applicable to the tag <book>:
Purchase this book The XML code corresponding to this function, which will then be incorporated in a request for executing the function, is as follows:

```
<purchase>
    <title>The Red and the Black</title>
    <author>Stendhal</author>
</purchase>
```

The procedure for executing one or more functions (step S29) will be detailed later in connection with FIG. 4.

In another embodiment, in which the selection of a tag of the XML document is automatically carried out by a software application to which the name of the tag to be selected has previously been supplied as an input parameter, at the step S21, a search is made, in the schema document, for a declarative tag of a predetermined function, associated with the selected tag of the computer document. The name of this predetermined function is supplied for example as an input parameter to the software application.

In this embodiment, the steps of creating and displaying (S25, S27) a function list are not performed.

Finally, in this embodiment, at the step S29, the predetermined function is automatically executed, without intervention from a user.

In connection with FIG. 2, detail will now be given of the step (S23), depicted in FIG. 1, of the processing of functions associated with a selected tag in the XML document.

The processing procedure illustrated in FIG. 2 is executed for each function identified (S21) in the schema document, connected with the current tag of the XML document.

The procedure starts with a step of selecting (S230) a first function tag in the schema document. For example, if the current tag in the XML document is <character>Julien Sorel</character>, the tag found in the schema document, at the step S19 (FIG. 1), is <xs:element name="character" type="xs:string"/>. The function declarative tags found at the step S21 are as follows:

```
<xs:function name="viewPicture" text="View photograph"
    href="http://oceania/web-obj/obj/viewPicture.exe"/>
and
<xs:function name="playText" text="Hear text"
    href="http://oceania/web-obj/obj/playText.exe"/>
```

Thus, in this example, the tag relating to the function "viewPicture" is selected first.

Next, at the step S231, an argument tag relating to the current function is selected. For example, in the case of the function "viewPicture", the argument tags are as follows:

```
<xs:argument name="author" fromTag="../../author" type="xs:string"/>
<xs:argument name="title" fromTag="../../title" type="xs:string"/>
<xs:argument name="character" fromTag="character" type="xs:string"/>
```

Thus, for example, the argument tag "author" is taken to start with.

Then, the argument name (attribute: name="...") and the path, or more generally the access mode, for accessing the argument value in the XML document, are read (S232) from the selected argument tag. This path is coded by the value of the attribute "fromTag". For the tag "author" this path is "../../author".

At the step S233, the value of the argument under consideration is obtained from the XML document according to the value of the attribute "fromTag". The value of the attribute "fromTag" thus defines a mode of identifying the value of a tag of the XML document to be assigned to the argument under consideration.

The mode of determining the value of an argument (S233), by defining a path, will be detailed later in connection with FIGS. 3a-3b.

Alternatively, the value of an argument can also be obtained by identifying, in the XML document, the tag whose name is identical to the name defined in the declarative tag of the argument in the schema document.

This is for example the case for the argument tag <xs:argument name="author" type="xs:string"/> associated with the function "purchase" (in the schema document) which is defined for the tag <book> of the XML document. Thus the value of the argument "author" of the function "purchase" corresponds to the value of the tag <author> in the XML document, that is to say the character string "Stendhal".

According to a variant embodiment, complementary or alternative to the preceding two, the value to be assigned to an argument can be supplied by a user by means of a control device such as a computer keyboard.

Returning to FIG. 2, at the step S234, a test is made as to whether or not the argument whose value has been determined is the last of the arguments defined for the current function. If this is not the case, the step S231 is returned to in order to select another argument tag, and the procedure starts again as described previously.

On the contrary, if this is the case, the procedure goes to the step S235 at which the function thus processed (that is to say the function and value of the corresponding arguments) is saved in memory.

Similarly, at the step S236, a test is made as to whether or not the function which has just been stored is the last of the functions declared in the schema document for the current tag in the XML document. In the negative, the step S230 is returned to and the procedure starts again as described previously.

In the affirmative, the step of processing (S23) the functions corresponding to a selected tag in the XML document (the current tag) is finished.

In connection with FIGS. 3a-3b, detail will now be given of the step of determining (S233, FIG. 2) the value of an argument, in the case where the mode of determining this value is coded by the attribute "fromTag" of an argument tag in the XML Schema document.

In accordance with the invention, as described below, the mode of identifying a tag of the XML document whose value is to be assigned to an argument under consideration is coded in the declarative tag of that argument, as information defining a path in the XML document, from the current tag to the tag whose value is to be assigned to the argument.

In FIG. 3a, the procedure starts with a test step S2330 in which it is determined whether or not the information coded in the attribute "fromTag" of the argument tag under consideration defines a relative path.

Case 1: A first form of relative path is defined according to the invention by the syntax fromTag="../../tag_name" where "tag_name" designates the name of a tag of the XML document. For example, in the schema document, there is fromTag="../../author" in the argument tag "author" associated with the function "playText" in the schema document.

Case 2: A second form of relative path is defined according to the invention by the syntax fromTag="tag_name", for example, fromTag="character" as is the case in the argument tag "character" associated with the function "playText" in the schema document.

Case 3: A non-relative path is defined according to the invention by the syntax fromTag="tag_name", for example, fromtag="/author" (not present in the example schema document given here).

Thus at the step S2330, if the path is not a relative path, for example fromTag="/author" (Case 3 above), at the step S2332, the program according to the invention points to the start tag (the root tag) of the XML document processed. In the example given here, this is the tag <book>.

Next, at the step S2333, the path defined by the attribute fromTag is applied to the XML document. In the case of the path "/author", the child tag <author> of the XML document is then pointed to. Next, at the step S2334, the value of the tag pointed to at the previous step, that is to say "Stendhal", is read.

Finally, at the step S2335, this value is returned in order to assign it to the argument under consideration of the processed function in the schema document.

Returning to the step S2330, if the path coded by the attribute fromTag is a relative path (Case 1 or 2 above), at the step S2331, the current tag of the XML document is pointed to.

Thus, in Case 2 above, if the current tag is:
<character>Julien Sorel</character>
the value of the attribute "fromTag" being "character", at the step S2333 this tag is remained on, and at the step S2334 its value "Julien Sorel" is read, which is sent to the argument under consideration of the processed function (for example "playText").

In the example given above with Case 1, the current tag pointed to at the step S2331 would be, for example, <character>Julien Sorel</character>

Then, at the step S2333, in the XML document, the path defined by the value of the attribute "fromTag", that is "../../author", is travelled.

Consequently, one level is gone up according to the instruction '../' in the tree structure defined by the XML document, and the tag <characters> is then pointed to. Next, one more level is gone up according to the second instruction '../', and the tag <book> is then ended up at. Finally, according to the instruction '/author', the tag <author>Stendhal</author> is pointed to.

Finally, the value of the tag pointed to, that is to say "Stendhal", is read at the step S2334, and then this value is returned (S2335) to the argument tag under consideration (for example, the argument "author") of the processed function (for example, "playText") in the schema document.

FIG. 3b illustrates the processing according to two path definition modes coded in an argument tag according to the invention. These two modes correspond respectively to the relative mode according to Case 1 above, and to the non-relative mode according to Case 3 above.

The diagram of FIG. 3b illustrates the tree structure of the XML document (book.xml) described above. The route marked 31 indicates a path coded by fromTag="../../author" (Case 1 above). As illustrated, following the route 31, one level (../) is gone up from the current tag "character" with the value "Julien Sorel", then the tag "characters" is ended up at, then one more level (..) is gone up, then the tag "book" is ended up at; and finally one level (/author) is gone down to finish on the tag "author".

On the other hand, the route marked 30 relates to a path coded by fromTag="/author" (Case 3 above). The current tag is also the tag "character" with the value "Julien Sorel". As described above, the procedure starts by going up to the root tag ("book") and goes down to the tag marked ("author").

In connection with FIG. 4, detail will now be given of the step of executing a function applicable to a tag of an XML document (step S29, FIG. 1). As mentioned above in connection with FIG. 1, a new window is displayed on the screen showing the functions applicable to the selected tag of the XML document. For example, if the tag selected in the XML document given as an example is <character>Julien Sorel</character>, the following text will be displayed on the screen, to indicate to the user the functions which apply directly to the current tag:

```
<viewPicture>
    <author>Stendhal</author>
    <title>The Red and the Black</title>
    <character>Julien Sorel</character>
</viewPicture>
```

View Photograph

Hear Text

The XML code corresponding to the second function ("view photograph"), which will then be incorporated in a request for executing this function, is as follows:

```
<playText>
    <author>Stendhal</author>
    <title>The Red and the Black</title>
    <character>Julien Sorel</character>
</PlayText>
```

The XML code corresponding to the second function ("hear text"), which will then be incorporated in a request for executing this function, is as follows:

The procedure for executing a function illustrated in FIG. 4 starts with the step S290 at which the program of the invention is placed in a mode awaiting the selection by a user of at least one function from among the displayed list. In the example above, the user can for example click on "View photograph" and/or "Hear text".

Of course, in the other embodiment in which one (or more) predetermined function is automatically executed by the software application according to the invention, this step awaiting a selection by a user is not performed.

At the following step, it is determined, for each selected function, whether the function is local, that is to say whether the executable code of the function is stored on the user computer, or whether the executable code is accessible by downloading from a server computer system on the network. For this purpose, the value of the attribute "href" associated with each function in the schema document is analysed. In the example given above (book.xsd), all the functions defined in the schema document are executable remotely on a server "oceania".

However, if the function is local or if the executable code of the function has already previously been loaded into the client computer, execution of the function is immediate (step S292). In the contrary case, a remote execution request message is generated and sent through the network to the server system (step S293). In practice, this is an HTTP request.

At the step S294, the program is then placed in a state awaiting a reply message (HTTP reply) containing either a result (for example a digital image or digitized voice) and/or a message indicating whether or not the execution of the function finished correctly. Finally, at the step S295, the result of executing the function is displayed, for example within a new window displayed on the screen, and/or used, on the user system.

Thus, in the above example, if the user clicked on "view photograph", he receives in return on his computer the photograph of a stage actor interpreting the role of Julien Sorel. If he clicked on "Hear text", he receives in return a digitized sample of the voice of the stage actor interpreting a piece of text originating from the work.

There will now be described in connection with FIG. 5 a computer system (10) or computer capable of implementing a method for processing a computer document according to the invention. This computer system is for example a microcomputer or a workstation.

In this embodiment, the method for processing a document according to the invention is implemented by the execution of a computer program according to the invention loaded in this computer system.

The computer system 10 conventionally has a communication bus 112 to which there are connected:

A central unit 100 (microprocessor);

A ROM memory 101, in which there can be stored the executable code of the computer program of the invention;

A RAM memory 102, having registers adapted to record variables modified during execution of the aforementioned program;

A screen 103 serving as an interface with a user, with the help of a keyboard 104 or any other means, such as for example a mouse 105. This screen can enable a user to view, for example through a Web browser, a computer document such as an XML document;

A hard disk 106, on which there can be stored, as an alternative to the ROM memory, the executable code of the program according to the invention. The source code of the program can also be stored on the hard disk and compiled at the time of execution of the program;

A floppy disk drive 107 adapted to receive a floppy disk 7. The program of the invention stored on a floppy disk can thus alternatively be loaded into the computer 10 via the floppy disk drive 107;

A CD disk drive 108 adapted to read a CD disk 8. The program of the invention (source or executable) stored on a CD disk can thus alternatively be loaded into the computer 10 via the CD disk drive 108;

a PC Card drive 109 can, in the same way, allow loading into the computer of the program of the invention stored on a PC Card 9;

an interface for communication 110 with a communication network 1 making it possible to send/receive messages to/from other systems connected to the network. These are notably, within the context of the invention, messages requesting documents (XML and XML Schema), messages requesting execution of remote functions, and reply messages following the execution of functions. Message communication on the network uses the HTTP protocol, according to the preferred embodiment of the invention. Moreover, this communication interface 110 also makes it possible to download the document processing program according to the invention, from another computer system on the network.

It must be noted, on the one hand, that the communication bus 112 allows communication between the various elements included in the computer system 10 or connected thereto. On the other hand, the representation of the bus is not limitative and, notably, the central unit (100) is capable of communicating instructions to any element of the computer 10 directly or by means of another element of this computer.

To summarize, the invention described here concerns a method and a device for processing a computer document in a computer system, said computer system possibly being connected to a communication network. According to the preferred embodiment, the steps of the method are determined by the instructions of a message processing program according to the invention, and the method is implemented when this program is loaded into a computer whose operation is then controlled by the execution of the program.

Consequently, the invention also applies to a computer program, particularly a computer program on or in an information medium, adapted to implement the invention. This program can use any programming language whatsoever, and be in the form of source code, object code, or intermediate code between source code and object code such as in a partially compiled form, or in any other form whatsoever desirable for implementing a method according to the invention. The information medium can be any entity or device whatsoever capable of storing the program.

For example, the medium can comprise a storage means, such as a ROM, for example a CD-ROM or a semiconductor ROM, or a magnetic recording means, for example a floppy disk or a hard disk. Moreover, the medium can be a transmissible medium such as an electrical or optical signal, which can be conveyed via an electrical or optical cable, or else by radio or by other means.

Alternatively, the medium can be an integrated circuit in which the program is incorporated, the circuit being adapted for executing the method in question, or for being used in the execution of the method.

Of course, the present invention is not limited to the details of the embodiments described here by way of example, but on the contrary applies to the modifications within the capability of persons skilled in the art, without departing from the scope of the invention.

The invention claimed is:

1. A method for processing a portion of a computer document represented in a markup language, the portion of the computer document being associated with "a schema document represented in a schema type markup language, the schema document defining a structure of said portion of the computer document, the processing method comprising the following steps:
   (A)—selecting a current tag, in said portion of the computer document;
   (B)—searching in the schema document for at least one declarative tag referring to an executable function associated with the current tag, wherein the function declarative tag is expressed in the schema document using
     a first keyword identifying the junction declarative tag as such,
     a second keyword identifying a field following said first keyword whose value defines a name of the function, and
     a third keyword identifying an optional field whose value is text; and
   (C)—creating a list of executable functions applicable to the current tag from the at least one declarative tag of the executable function found in the schema document.

2. A method according to claim 1, in which the content of the portion of the computer document is displayed on a display screen of a computer system, the current tag being selected by a user on the display screen by means of a control device, such as a pointing device, the method further comprising the following step:
   (D)—displaying the list of functions applicable to the current tag.

3. A method according to claim 2, also having the following step:
   (E)—executing at least one function from the displayed list, in response to a command generated by an action of the user on a control device such as a computer keyboard or a pointing device.

4. A method according to claim 3, in which the function is executed remotely on a computer system connected through a communication network.

5. A method according to claim 1, in which the structure of each of the tags contained in said portion of the computer document is defined in the schema document by appropriate tags in which a particular field contains the name of the corresponding tag of the portion of the computer document.

6. A method according to claim 5, in which said step of searching (B) for at least one declarative tag of a function associated with the current tag in the portion of the computer document comprises the following sub-steps:
   (B1)—searching in the schema document for a tag having the name of the current tag; and
   (B2)—searching for function declarative tags connected with the tag found in said step (B1).

7. A method according to claim 1, in which the step (C) of creating a list of functions applicable to said current tag includes the following sub-steps, performed for each declarative tag of a function found at the step (B):
   (C1)—reading at least one declarative tag of an argument of the function, that tag having a field defining the argument name, and a field defining the argument type; and
   (C2)—determining the value of each argument by assigning, to said argument, the value of a tag of the portion of the computer document which is identified according to an identification mode coded in the declarative tag of the argument, in the schema document, or by assigning, to said argument, a value supplied by the user.

8. A method according to claim 7, in which, at the step (C2), the mode of identifying a tag of the portion of the computer document, coded in the declarative tag of the argument, in the schema document, consists of identifying, in the portion of computer document, the tag whose name is identical to the name defined in the declarative tag of the argument in the schema document.

9. A method according to claim 7, in which, at the step (C2), said mode of identifying a tag of the portion of the computer document, coded in the declarative tag of the argument, in the schema document, consists of supplying the path, in the portion of the computer document, from the current tag to the tag whose value is to be assigned to the argument.

10. A method according to claim 1, in which each declarative tag of a function also includes the electronic address enabling the execution of the function to be obtained, or includes the executable code of the function, said executable code being able to be in the form of source code, object code, or code that is intermediate between source code and object code.

11. A method according to claim 1, in which the content of the portion of the computer document is represented in the XML language, and the content of the schema document is represented in the XML Schema language.

12. A method according to claim 11, in which a function declarative tag is expressed in the schema document in the following manner:
   <xs:function name=". . . " text=". . . "/>
   where:
     "function" is the key word identifying a function declaration tag,
     "name=" is a key word identifying a field whose value defines the function name,
     and
     "text=" is a key word identifying an optional field whose value is text intended to be displayed for the user, when the function list is displayed.

13. A method according to claim 11, in which declarative tags of an argument are expressed in the schema document in the following manner:
   <xs:argument name="..." type="..."/>
   ...
   <xs:argument name="..." type="..."/>
   where:
     "argument" is the key word identifying an argument declaration tag,
     "name=" is a key word identifying a field whose value defines the argument name, and
     "type=" is a key word identifying a field whose value defines the argument type.

14. A method according to claim 13, in which a declarative tag of an argument has an additional field identified by a key word, whose value represents a path, in said portion of the computer document, making it possible to find the tag whose value is to be assigned to the argument.

* * * * *

UNITED STATES PATENT AND TRADEMARK OFFICE
CERTIFICATE OF CORRECTION

PATENT NO.        : 7,260,776 B2
APPLICATION NO.   : 10/179177
DATED             : August 21, 2007
INVENTOR(S)       : Jean-Jacques Moreau et al.

It is certified that error appears in the above-identified patent and that said Letters Patent is hereby corrected as shown below:

COLUMN 7

Lines 6-56,

```
"<xs:element name="book">
    <xs:complexType>
        <xs:function name="purchase" text="Purchase this book"
            href="http://oceania/web-obj/obj/purchase.exe"/>
            <xs:arguments>
                <xs:argument name="author" type="xs:string"/>
                <xs:argument name="title" type="xs:string"/>
            </xs:arguments>
        </xs:function>
        <xs:function name="orderTeaser" text="Download the 1st chapter"
            href="http://oceania/web-obj/obj/orderTeaser.exe"/>
            <xs:arguments>
                <xs:argument name="author" type="xs:string"/>
                <xs:argument name="title" type="xs:string"/>
            </xs:arguments>
        </xs:function>
        <xs:element name="title" type="xs:string"/>
        <xs:element name="author" type="xs:string"/>
        <xs:element name="characters">
```

UNITED STATES PATENT AND TRADEMARK OFFICE
CERTIFICATE OF CORRECTION

PATENT NO. : 7,260,776 B2
APPLICATION NO. : 10/179177
DATED : August 21, 2007
INVENTOR(S) : Jean-Jacques Moreau et al.

It is certified that error appears in the above-identified patent and that said Letters Patent is hereby corrected as shown below:

```
<xs:complexType>
    <xs:sequence minOccurs="0" maxOccurs="unbounded">
        <xs:element name="character" type="xs:string"/>
        <xs:complexType>
            <xs:function name="viewPicture" text="View photograph"
                href="http://oceania/web-obj/obj/viewPicture.exe"/>
            <xs:arguments>
                <xs:argument
                    name="author"
                    fromTag="../../author"
                    type="xs:string"/>
                <xs:argument
                    name="title"
                    fromTag="../../title"
                    type="xs:string"/>
                <xs:argument
                    name="character"
                    fromTag= "character"
                    type="xs:string"/>
            </xs:arguments>
        </xs:function>
        <xs:function name="playText" text="Hear text"
```

UNITED STATES PATENT AND TRADEMARK OFFICE
CERTIFICATE OF CORRECTION

PATENT NO. : 7,260,776 B2
APPLICATION NO. : 10/179177
DATED : August 21, 2007
INVENTOR(S) : Jean-Jacques Moreau et al.

It is certified that error appears in the above-identified patent and that said Letters Patent is hereby corrected as shown below:

```
              href="http://oceania/web-obj/obj/playText.exe"/>
           <xs:arguments>
              <xs:argument
                 name="author"
                 fromTag="../../author"
                 type="xs:string"/>
              <xs:argument
                 name="title"
                 fromTag="../../title"
                 type="xs:string"/>
              <xs:argument
                 name="character"
                 fromTag= "character"
                 type="xs:string"/>
           </xs:arguments>
        </xs:function>
      </xs:complexType>
    </xs:element>
   </xs:sequence>
  </xs:complexType>
 </xs:element>
</xs:complexType>
```

UNITED STATES PATENT AND TRADEMARK OFFICE
CERTIFICATE OF CORRECTION

PATENT NO. : 7,260,776 B2
APPLICATION NO. : 10/179177
DATED : August 21, 2007
INVENTOR(S) : Jean-Jacques Moreau et al.

It is certified that error appears in the above-identified patent and that said Letters Patent is hereby corrected as shown below:

```
</xs:element>"
        should read
--<xs:element name="book">
    <xs:complexType>
        <xs:function name="purchase" text="Purchase this book"
            href="http://oceania/web-obj/obj/purchase.exe"/>
          <xs:arguments>
            <xs:argument name="author" type="xs:string"/>
            <xs:argument name="title" type="xs:string"/>
          </xs:arguments>
        </xs:function>
        <xs:function name="orderTeaser" text="Download the 1st chapter"
            href="http://oceania/web-obj/obj/orderTeaser.exe"/>
          <xs:arguments>
            <xs:argument name="author" type="xs:string"/>
            <xs:argument name="title" type="xs:string"/>
          </xs:arguments>
        </xs:function>
        <xs:element name="title" type="xs:string"/>
        <xs:element name="author" type="xs:string"/>
        <xs:element name="characters">
           <xs:complexType>
```

UNITED STATES PATENT AND TRADEMARK OFFICE
CERTIFICATE OF CORRECTION

PATENT NO. : 7,260,776 B2
APPLICATION NO. : 10/179177
DATED : August 21, 2007
INVENTOR(S) : Jean-Jacques Moreau et al.

It is certified that error appears in the above-identified patent and that said Letters Patent is hereby corrected as shown below:

```
<xs:sequence minOccurs="0" maxOccurs="unbounded">
    <xs:element name="character" type="xs:string"/>
        <xs:complexType>
            <xs:function name="viewPicture" text="View photograph"
                href="http://oceania/web-obj/obj/viewPicture.exe"/>
            <xs:arguments>
                <xs:argument
                    name="author"
                    fromTag="../../author"
                    type="xs:string"/>
                <xs:argument
                    name="title"
                    fromTag="../../title"
                    type="xs:string"/>
                <xs:argument
                    name="character"
                    fromTag= "character"
                    type="xs:string"/>
            </xs:arguments>
        </xs:function>
        <xs:function name="playText" text="Hear text"
            href="http://oceania/web-obj/obj/playText.exe"/>
```

UNITED STATES PATENT AND TRADEMARK OFFICE
CERTIFICATE OF CORRECTION

PATENT NO. : 7,260,776 B2
APPLICATION NO. : 10/179177
DATED : August 21, 2007
INVENTOR(S) : Jean-Jacques Moreau et al.

It is certified that error appears in the above-identified patent and that said Letters Patent is hereby corrected as shown below:

```
<xs:arguments>
    <xs:argument
        name="author"
        fromTag="../../author"
        type="xs:string"/>
    <xs:argument
        name="title"
        fromTag="../../title"
        type="xs:string"/>
    <xs:argument
        name="character"
        fromTag= "character"
        type="xs:string"/>
</xs:arguments>
</xs:function>
</xs:complexType>
</xs:element>
</xs:sequence>
</xs:complexType>
</xs:element>
</xs:complexType>
</xs:element>--.
```

COLUMN 11

Line 27, "book" should read --book.--.

COLUMN 13

Line 36, "fromtag="/author"" should read --fromTag="/author"--.

Line 67, "Sorel</character>" should read --Sorel</character>.--.

UNITED STATES PATENT AND TRADEMARK OFFICE
CERTIFICATE OF CORRECTION

PATENT NO. : 7,260,776 B2
APPLICATION NO. : 10/179177
DATED : August 21, 2007
INVENTOR(S) : Jean-Jacques Moreau et al.

It is certified that error appears in the above-identified patent and that said Letters Patent is hereby corrected as shown below:

COLUMN 14

Line 27, "level (..)" should read --level (../)--.

Lines 48-59,

"

<viewPicture>
    <author>Stendhal</author>
    <title>The Red and the Black</title>
    <character>Julien Sorel</character>
</viewPicture>

View photograph

Hear text

The XML code corresponding to the second function ("view photograph"), which will then be incorporated in a request for executing this function, is as follows:"

should read

--View photograph

Hear text

The XML code corresponding to the first function ("view photograph"), which will then be incorporated in a request for executing this function, is as follows:

<viewPicture>
    <author>Stendhal</author>
    <title>The Red and the Black</title>
    <character>Julien Sorel</character>
</viewPicture>--.

UNITED STATES PATENT AND TRADEMARK OFFICE
CERTIFICATE OF CORRECTION

PATENT NO. : 7,260,776 B2
APPLICATION NO. : 10/179177
DATED : August 21, 2007
INVENTOR(S) : Jean-Jacques Moreau et al.

It is certified that error appears in the above-identified patent and that said Letters Patent is hereby corrected as shown below:

Lines 61-67,

"_____

\<playText\>

\<author\>Stendhal\</author\>

\<title\>The Red and the Black\</title\>

\<character\>Julien Sorel\</character\>

\</PlayText\>

_____" should be deleted.

COLUMN 15

Line 3, "is as follows:" should read --is as follows:

_____

\<playText\>

\<author\>Stendhal\</author\>

\<title\>The Red and the Black\</title\>

\<character\>Julien Sorel\</character\>

\</PlayText\>

_____--.

COLUMN 16

Line 37, "unit." should read --unit--.

COLUMN 17

Line 13, ""a" should read --a--.

Line 17, "tag," should read --tag--.

Line 24, "junction" should read --function--.

UNITED STATES PATENT AND TRADEMARK OFFICE
CERTIFICATE OF CORRECTION

PATENT NO. : 7,260,776 B2
APPLICATION NO. : 10/179177
DATED : August 21, 2007
INVENTOR(S) : Jean-Jacques Moreau et al.

It is certified that error appears in the above-identified patent and that said Letters Patent is hereby corrected as shown below:

COLUMN 18

Line 14, "of" should read --of the--.

Line 27, "said" should read --the--.

Signed and Sealed this

Seventeenth Day of March, 2009

JOHN DOLL
*Acting Director of the United States Patent and Trademark Office*